United States Patent
Collias

(10) Patent No.: US 11,377,293 B2
(45) Date of Patent: Jul. 5, 2022

(54) ADSORBENT MATRIX AS PROPELLANT IN AEROSOL PACKAGE

(71) Applicant: The Procter & Gamble Company, Cincinnati, OH (US)

(72) Inventor: Dimitris Ioannis Collias, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 258 days.

(21) Appl. No.: 16/601,616

(22) Filed: Oct. 15, 2019

(65) Prior Publication Data

US 2020/0148460 A1 May 14, 2020

Related U.S. Application Data

(60) Provisional application No. 62/758,726, filed on Nov. 12, 2018.

(51) Int. Cl.
*B65D 83/42* (2006.01)
*C09K 3/30* (2006.01)
*B01J 20/22* (2006.01)

(52) U.S. Cl.
CPC ............ *B65D 83/42* (2013.01); *B01J 20/226* (2013.01); *C09K 3/30* (2013.01)

(58) Field of Classification Search
CPC ...... B65D 83/42; B65D 83/752; B65D 83/62; B65D 83/663; B01J 20/226; C09K 3/30
See application file for complete search history.

(56) References Cited

U.S. PATENT DOCUMENTS

| | | | |
|---|---|---|---|
| 4,049,158 A | 9/1977 | Lo et al. | |
| 6,030,698 A | 2/2000 | Burchell et al. | |
| 8,746,503 B2 * | 6/2014 | Lim | B65D 83/625 222/402.1 |
| 2006/0049215 A1 | 3/2006 | Lim et al. | |
| 2010/0200433 A1 | 8/2010 | Stahley | |
| 2012/0318830 A1 * | 12/2012 | Lim | B65D 83/663 222/394 |
| 2014/0117054 A1 * | 5/2014 | Ryan | C09K 3/30 222/386.5 |
| 2018/0001296 A1 * | 1/2018 | Holbrook | B01J 20/103 |

OTHER PUBLICATIONS

Lin Y et al: "Direct synthesis of Amine-Functionalized MIL-101(Cr) nanoparticles and application for C02 capture" RSC Advances,vol. 1 . 2, No. 16,Aug. 14, 2012, pp. 6417-6419.
Llewellyn Philip L et al: 11 High Uptakes of C02 and CH4 in Mesoporous Metal-OrganicFrameworks MI L-HI0 and MI L-101, Jan. 29, 2008, 6 pages.
Zhang Zhongzheng et al: "Chromium-Based Metal-Organic Framework/ Mesoporous Carbon Composite: Synthesis, Characterization and C02 Adsorption" Jan. 29, 2015, pp. 77-86.
15409 PCT Search Report and Written Opinion for PCT/US2019/ 059116 dated Mar. 9, 2020.

* cited by examiner

*Primary Examiner* — Jason K Niesz
(74) *Attorney, Agent, or Firm* — Steven Robert Chuey; Sarah M DeCristofaro

(57) ABSTRACT

Adsorbent materials adsorb large quantities of inert permanent gases and maintain the initial pressure inside aerosol packages throughout the useful life of the packages, thus acting as propellants.

6 Claims, No Drawings

ADSORBENT MATRIX AS PROPELLANT IN AEROSOL PACKAGE

FIELD OF THE INVENTION

The present invention generally relates to combinations of adsorbent materials and inert permanent gases, i.e., adsorbent matrices, that act as propellants in aerosol packages. More specifically, the adsorbent material can be selected from the group comprising metal organic framework (MOF), covalent organic framework (COF), zeolitic imidazolate framework (ZIF), and combinations thereof, and the inert permanent gas can be selected from the group comprising nitrogen, carbon dioxide, helium, and argon. The adsorbent material adsorbs large quantities of the inert permanent gas and maintains the initial pressure inside the aerosol package throughout the useful life of the package.

BACKGROUND OF THE INVENTION

Aerosol dispensers have been in the market for a long period of time. They contain a propellant, which is typically a liquid at room temperature and elevated pressure, i.e., it is a liquified gas. Thus, the propellant maintains the initial pressure inside the dispenser until all the liquid propellant is consumed, which typically happens at the end of life of the dispenser. Typical hydrocarbons in the early years of aerosol dispensers were CFC-12 (dichlorodifluoromethane) and CFC-114 (dichlorotetrafluoroethane), which were totally non-flammable. Then, in mid-1978, the U.S. government banned the use of CFC propellants because of their ability to deplete the stratospheric ozone. Then, the industry moved to HCFC-22 (monochlorodifluoromethane) and HCFC-142b (1-chloro-1,1-difluoroethane), which had problems with slight flammability (HCFC-142b), mutagenicity (HCFC-22), and excessive internal pressure at 130° F. (180 psig limit by the DOT; HCFC-22). In about 1993, the U.S. EPA banned these two propellants because they determined that, like the CFCs, they cause depletion of the stratospheric ozone. In 1994, DuPont introduced the HFC-134a (1,1,1,2-tetrafluoroethane) as a non-flammable propellant, which however had excessive vapor pressure at 130° F. (202 psig), and thus required specially-designed dispensers. In addition to those concerns, HFC-134a had a global warming potential (GWP) 1300 times as great as carbon dioxide (GWP of carbon dioxide=1). A few years later, HFC-152a (1,1-difluoroethane) was introduced as a propellant with GWP 138. Also, HFC-152a is flammable. More recently, Honeywell (Fluorine Products Division) introduced HFO-1234ze(E) (trans-1,3,3,3-tetrafluoroprop-1-ene; with reported GWP less than 1) and DuPont introduced HFO-1234yf (1,1,1,2-tetrafluoroprop-1-ene). Other typical propellants include propane, isobutane, n-butane, dimethyl ether (DME), and their blends.

The use of inert permanent gases as propellants is hindered by the fact that inert permanent gases exhibit lower pressure in the dispenser as the product is dispensed and the headspace increases. That decreasing pressure throughout the life of the aerosol product affects the aerosol qualities.

Accordingly, there is a need for a material that would allow inert permanent gases to be used as propellants in aerosol products. That material needs to adsorb large quantities of the inert permanent gas and release the appropriate amount of that gas very quickly when the pressure is reduced. The advantages of such a system are low cost compared to the latest propellants, low GWP (i.e., better sustainability), non-flammability, and constant pressure throughout the life of the aerosol product. Another advantage of such a system is the ability to refill the aerosol package with the inert permanent gas after each emptying of the package and reuse it many times in the future (i.e., stronger support for the circular economy concept).

SUMMARY OF THE INVENTION

In one embodiment of the present invention, a method for generating constant pressure inside an aerosol package is presented. The method comprises the use of an adsorbent material and an inert permanent gas; wherein said inert permanent gas is adsorbed into said adsorbent material to form an adsorbent matrix; wherein said adsorbent matrix has an uptake constant K greater than about 0.015 g/g·psig at about 100 psig; wherein said adsorbent matrix generates a pressure inside said aerosol package; and wherein said pressure remains constant throughout the useful life of said aerosol package.

In another embodiment of the present invention, an aerosol package is presented. The method comprises the use of an adsorbent material and an inert permanent gas; wherein said inert permanent gas is adsorbed into said adsorbent material to form an adsorbent matrix; wherein said adsorbent matrix generates a final pressure ratio pressure; and wherein said final pressure ratio is greater than about 2.

In yet another embodiment of the present invention, an aerosol package is presented. The aerosol package comprises a bag, a can, and a valve; wherein the volume between said bag filled with product and said can is a propellant volume; wherein said propellant volume comprises an MOF and carbon dioxide; wherein said carbon dioxide is partly adsorbed in said MOF, forming an adsorption matrix with uptake constant K greater than about 0.015 g/g·psig at about 100 psig, and the remainder of said carbon dioxide is in equilibrium with said adsorbed carbon dioxide at a pressure; and wherein said pressure remains constant throughout the useful life of said aerosol package.

DETAILED DESCRIPTION OF THE INVENTION

I Definitions

As used herein, the term "BET specific surface area" refers to a specific surface area (i.e., surface area per unit mass) measured using the Brunauer—Emmett—Teller theory that describes the physical adsorption of inert gas molecules on a solid surface and utilizes probing gases (e.g., nitrogen; that do not chemically react with the material surface) as adsorbates to quantify the specific surface area.

As used herein, the term "MOF" refers to Metal Organic Framework, which is a material synthesized through the reaction of an organic component and an inorganic component under controlled synthesis conditions (e.g. pH, solvent, temperature, concentrations) and using the solvent as the template for the synthesis. MOFs are highly-ordered frameworks in which the metal ligand complexes form vertices that are connected by organic linkers and often results in very high BET surface areas and pores of molecular dimensions.

As used herein, the term "COF" refers to Covalent Organic Framework, which is a material synthesized similar to MOF; however, in the COF all linked groups are organic.

As used herein, the term "ZIF" refers to Zeolitic Imidazolate Framework, which is a special form of MOF in which the transition metal ions are linked by substituted imidazolate ions and form frameworks with a topology of a known zeolite or zeolite-like.

As used herein, the term "constant" refers to a pressure varying by less than about 20% around a set pressure value.

As used herein, the term "permanent gas" refers to a gas which is gaseous under typical use conditions (e.g. temperature between about 0° C. and about 60° C., and pressure between about atmospheric and about 200 psig).

As used herein, the term "inert permanent gas" refers to a permanent gas which does not negatively affect (either physically or chemically) the materials which it comes in contact with.

As used herein, the term "adsorbent matrix" refers to the combination of an adsorbent material and an inert permanent gas, which has adsorbed into this adsorbent material.

As used herein, the term "final pressure ratio" refers to the ratio of the final pressure in the aerosol package in the presence of the adsorbent matrix and the final pressure in the aerosol package in the absence of the adsorbent matrix.

As used herein, the term "uptake constant of the adsorbent matrix" refers to the the mass of the inert gas adsorbed in the adsorbent material per unit mass of the adsorbent material and unit pressure, all measured at 25° C. The uptake constant of the adsorbent matrix is noted as K with units of (g gas)/(g adsorbent material)·(psig) or simply g/g·psig.

As used herein, the term "bag-in-bottle" refers to an aerosol package comprising a bag attached to a bottle, and a valve. The product formulation is placed in the bag, the propellant is placed in the space between the bottle and the bag, and the propellant pushes the product through the valve when it is actuated.

As used herein, the term "bag-on-valve" refers to an aerosol package comprising a bag attached to a valve, whereas the bag is inside a bottle. The product formulation is placed in the bag, the propellant is placed in the space between the bottle and the bag, and the propellant pushes the product through the valve when it is actuated.

II Adsorbent Materials

Unexpectedly, it has been found that when MOF, COF, or ZIF materials are used as substrates for adsorption of inert permanent gases, the resulting adsorption matrices act as propellants to dispense products in aerosol form, i.e., generate a constant pressure inside the aerosol package. This constant pressure behavior is very similar to what typical hydrocarbon propellants exhibit when they transition from liquid to gas phase. Contrary to that, in the absence of these MOF, COF, or ZIF materials, the pressure of the inert permanent gases is reduced every time the consumer dispenses the product. This reduction in pressure throughout the life of the package has negative impact on the quality of the aerosol.

In one embodiment of the present invention, the adsorbent material is selected from the group comprising MOF, COF, ZIF, or mixtures thereof. In another embodiment of the present invention, the adsorbent material comprises an MOF. In yet another embodiment of the present invention, the adsorbent material comprises a COF. In even yet another embodiment of the present invention, the adsorbent material comprises a ZIF.

The MOF materials are porous periodic materials which include cationic metal-containing clusters (called secondary building units—SBU) linked by anionic organic linkers (typically carboxylates). Non-limiting examples of MOF materials are: MOF-5 [$Zn_4O$ tetrahedral groups linked by terephthalate groups (1,4-benzenedicaroxylate (BDC)); $Zn_4O(BDC)_3$]; MOF-177 [$Zn_4O$ tetrahedral groups linked by benzene tri-benzoic acid groups (BTB); $Zn_4O(BTB)_3$]; and MIL-101 [$Cr_3F(H_2O)_2O(BDC)_3 \cdot nH_2O$; n~25; BDC=1, 4-benzenedicarboxylate]. MOF-177 has a BET specific surface area between about 3,100 and about 4,630 $m^2/g$, pore diameter of 1.06-1.27 nm, pore volume of 2.65 mL/g, and $CO_2$ uptake of about 35 mmol/g (1.54 g/g) at ambient temperature and 45 bar pressure (4.5 MPa or 652.7 psi). At ambient temperature, the $CO_2$ uptake of MOF-177 is 0.08 g/g at 1 bar (0.1 MPa or 14.5 psi) and 0.4 g/g at 14 bar (1.4 MPa or 203 psi). MIL-101 has a BET specific surface area of about 3,000 m2/g, mesopores of 2.9 and 3.4 nm, pore volume of 1.8 mL/g, and $CO_2$ uptake of 0.74 g/g at 15 bar (1.5 MPa or 217.6 psi) and 1 g/g at 30 bar (3 MPa or 435.1 psi), both at ambient temperature.

The COF materials are porous periodic materials which include all organic linked groups. Non-limiting examples of COF materials are: COF-1 [condensed benzene 1,4-diboronic acid]; and COF-5 [benzene diboronic acid linked to a trigonal hexahydroxy SBU].

Finally, the ZIF materials are special cases of the MOF materials in which the transition metal ions are linked by substituted imidazolate ions and form frameworks that have topology either that of a known zeolite or zeolite-like. Non-limiting examples of ZIF materials are: ZIF-11 [with a zeolite RHO topology]; and ZIF-20 [with a zeolite LTA topology].

In one embodiment of the present invention, the MOF material comprises MIL-101. In another embodiment of the present invention, the MOF material comprises MOF-177.

In one embodiment of the present invention, the MOF material is in the form of powder. In another embodiment of the present invention, the MOF material is in the form of particles. In yet another embodiment of the present invention, the MOF material is in the form of a membrane. In even yet another embodiment of the present invention, the MOF material is in the form of a sheet.

In one embodiment of the present invention, the COF material is in the form of powder. In another embodiment of the present invention, the COF material is in the form of particles. In yet another embodiment of the present invention, the COF material is in the form of a membrane. In even yet another embodiment of the present invention, the COF material is in the form of a sheet.

In one embodiment of the present invention, the ZIF material is in the form of powder. In another embodiment of the present invention, ZIF material is in the form of particles. In yet another embodiment of the present invention, the ZIF material is in the form of a membrane. In even yet another embodiment of the present invention, the ZIF material is in the form of a sheet.

III Inert Permanent Gases

In one embodiment of the present invention, the inert permanent gas is selected from the group comprising nitrogen, carbon dioxide, helium, argon, air, moisture, and mixtures thereof. In another embodiment of the present invention, the inert permanent gas is selected from the group comprising nitrogen, carbon dioxide, helium, argon, and mixtures thereof. In yet another embodiment of the present invention, the inert permanent gas comprises carbon dioxide.

In one embodiment of the present invention, the inert permanent gas is adsorbed into the adsorbent material to create an adsorbent matrix. In another embodiment of the present invention, the pressure of the inert permanent gas is about 140 psig. In yet another embodiment of the present invention, the pressure of the inert permanent gas is about 140 psig and remains constant throughout the useful life of the aerosol package.

In one embodiment of the present invention, the pressure of the inert permanent gas is about 160 psig. In another embodiment of the present invention, the pressure of the inert permanent gas is about 160 psig and remains constant throughout the useful life of the aerosol package. In yet another embodiment of the present invention, the pressure of the inert permanent gas is about 180 psig. In even yet another embodiment of the present invention, the pressure of the inert permanent gas is about 180 psig and remains constant throughout the useful life of the aerosol package.

In one embodiment of the preset invention, the pressure of the inert permanent gas is less than about 140 psig. In another embodiment of the preset invention, the pressure of the inert permanent gas is less than about 160 psig. In yet another one embodiment of the preset invention, the pressure of the inert permanent gas is less than about 180 psig.

In one embodiment of the preset invention, the pressure of the inert permanent gas is less than about 100 psig. In another embodiment of the preset invention, the pressure of the inert permanent gas is less than about 80 psig. In yet another one embodiment of the preset invention, the pressure of the inert permanent gas is less than about 60 psig. In even yet another embodiment of the preset invention, the pressure of the inert permanent gas is less than about 40 psig.

IV Aerosol Packages

The aerosol packages comprise a bottle, a delivery device, and a valve. Optionally, the aerosol packages have a base cup, a label, a cap, and a trigger to improve the ergonomics of dispensing the aerosol product. In one embodiment of the present invention, the aerosol package uses a bag-on-valve (BOV) dispensing system. The system separates the product from the pressurizing agent with a bag attached to the valve. Preferably, the bag is hermetically sealed. The bag can be single layered or multi-layered laminate. The space between the bottle and the bag, where the adsorption matrix (i.e., adsorption material and inert permanent gas) resides, is called the headspace.

The aerosol products of the present invention are delivered from a total package comprising a delivery device, a valve to control flow, and a stable plastic package that holds the product when sealed using the valve. The delivery device can be any known delivery device including, but not limited to, button actuator and a porous sintered dome. Likewise, any known valve can be used that is capable of sealing the pressurized product within the plastic package and being easily opened and closed to control the release of the product to the delivery device. Both the delivery device and valve can be made of any material including, but not limited to, metal, plastic, or glass.

The uptake constant of the adsorbent matrix is noted as K with units of (g gas)/(g adsorbent material)·(psig) or simply g/g·psig. The amount of adsorbent material in the aerosol package is noted as M and the total amount of the inert gas in the aerosol package is noted as m, and both have units of g. The initial pressure in the headspace of the aerosol package is noted as $P_0$ with units of psig; and the ratio of initial headspace to final headspace is noted as $\lambda$, which is dimensionless. Then, the appropriate adsorbent matrix has an uptake constant K, wherein $$K \geq \left(\frac{m}{MP_0}\right)\left(\frac{1-1.25\lambda}{1-\lambda}\right).$$

In one embodiment of the present invention, the uptake constant of the adsorbent matrix is greater than about 0.015 g/g·psig at about 100 psig headspace pressure (or equivalently, about 1.5 g/g at about 100 psig). In another embodiment of the present invention, the uptake constant of the adsorbent matrix is greater than about 0.02 g/g·psig at about 100 psig headspace pressure (or equivalently, about 2 g/g at about 100 psig). In yet another embodiment of the present invention, the uptake constant of the adsorbent matrix is greater than about 0.04 g/g·psig at about 100 psig headspace pressure (or equivalently, about 4 g/g at about 100 psig). In even yet another embodiment of the present invention, the uptake constant of the adsorbent matrix is greater than about 0.08 g/g·psig at about 100 psig headspace pressure (or equivalently, about 8 g/g at about 100 psig).

In one embodiment of the present invention, the final pressure ratio is greater than about 2. In another embodiment of the present invention, the final pressure ratio is greater than about 2.5. In yet another embodiment of the present invention, the final pressure ratio is greater than about 3. In even yet another embodiment of the present invention, the final pressure ratio is greater than about 3.5.

V Examples

Example 1

An aerosol dispenser contains 300 mL of product in a bag and 100 mL of an MOF and $CO_2$ in the space outside the bag (also called headspace). The initial pressure in the dispenser $P_0$ is 100 psig (0.79 MPa or 7.9 bar) and the headspace contains 10 g of the MOF (i.e., M=10 g). At that pressure, the $CO_2$ uptake by the MOF is 2 g $CO_2$/g MOF (or equivalently, 45.5 mmol $CO_2$/g MOF), and thus the MOF has an uptake constant K equal to 0.02 g $CO_2$/g MOF·psig, and the total amount of $CO_2$ m is 21.4 g. When all the product is dispensed, the total headspace becomes 400 mL (i.e., $\lambda$=0.25) and the final pressure inside the dispenser becomes about 84 psig. If there is not any MOF in the headspace of the dispenser, the final $CO_2$ pressure would be about 25 psig. Thus, the final pressure ratio in the aerosol package is 84/25=3.36.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for generating constant pressure inside an aerosol package comprising the use of an adsorbent material and an inert permanent gas; wherein said inert permanent gas is adsorbed into said adsorbent material to form an adsorbent matrix; wherein said adsorbent matrix has an uptake constant K greater than about 0.015 g/g·psig at about 100 psig; wherein said adsorbent matrix generates a pressure inside said aerosol package; and wherein said pressure remains constant throughout the useful life of said aerosol package.

2. The method of claim 1, wherein said uptake constant K is greater than about 0.02 g/g·psig at about 100 psig.

3. The method of claim 1, wherein said uptake constant K is greater than about 0.04 g/g·psig at about 100 psig.

4. The method of claim 1, wherein said uptake constant K is greater than about 0.08 g/g·psig at about 100 psig.

5. The method of claim 1, wherein said adsorbent material is selected from the group comprising metal organic framework (MOF), covalent organic framework (COF), zeolitic imidazolate framework (ZIF), or mixtures thereof.

6. The method of claim 1, wherein said adsorbent material comprises an MOF.

* * * * *